Nov. 4, 1958 T. W. SNOW 2,858,873

MACHINES FOR STRAIGHTENING AND BUNDLING COMPONENTS

Filed Aug. 2, 1956 6 Sheets-Sheet 1

Inventor:
Thomas W. Snow
By his Attorney

Inventor:
Thomas W. Snow
By his Attorney

Inventor:
Thomas W. Snow
By his Attorney

Inventor:
Thomas W. Snow
By his Attorney

Inventor:
Thomas W. Snow
By his Attorney

MACHINES FOR STRAIGHTENING AND BUNDLING COMPONENTS

Filed Aug. 2, 1956 6 Sheets-Sheet 6

Inventor:
Thomas W. Snow
By his Attorney

United States Patent Office 2,858,873

Patented Nov. 4, 1958

2,858,873

MACHINES FOR STRAIGHTENING AND BUNDLING COMPONENTS

Thomas W. Snow, Melrose, Mass., assignor to United Shoe Machinery Corporation, Flemington, N. J., a corporation of New Jersey Application August 2, 1956, Serial No. 601,787

13 Claims. (Cl. 153—32)

This invention relates to machines for linking or belting components, and is more particularly concerned with providing improvements in a component packaging machine of the general type disclosed in a copending application Serial No. 463,022, filed October 18, 1954, in the names of Richard W. Daniels, Hammond P. Diggle, and Bruce N. Smith (now Patent No. 2,771,206, dated November 20, 1956). The invention is accordingly herein illustrated as applied to a machine embodying, in combination, mechanism for feeding in row formation electronic components having generally coaxial leads, means for straightening the leads of the successive components, and mechanism for thereafter binding the successive components by their bodies or leads, for example, by tape. It is to be understood that while the invention in some aspects thus affords a machine for bundling components in a manner well adapted to the needs of automatic component inserting machines, application of the invention in its various aspects is not thus limited, nor even restricted to machines for processing electrical components.

The leads of such components as resistors, condenser, and many other electronic parts which are to be electrically connected in assemblies are usually of soft, flexible copper wire. They accordingly are easily bent in the course of normal handling and, unless a number of components is packaged in some convenient way, their leads tend to become snarled and not readily extricated from one another. To facilitate the storage and/or orderly feeding of successive components, for example for use in machines for forming and then inserting the leads endwise in chassis, the packaging machine described in the above-mentioned application was devised. It is adapted to belt components by applying continuous tapes across the coaxial leads and is provided with means for straightening the leads prior to belting, better to insure accurate and reliable lead formation and insertion.

In view of the foregoing, it is a primary object of this invention to provide a component belting machine of more versatile and improved character, said machine to incorporate more effective wire working means, as well as being capable of straightening and packaging components of different sizes and having means for applying strip material alternatively to the leads of such components or to their bodies. To this end, one feature of the invention resides in the combination with a raceway adjustable to accommodate different sizes of component bodies in row formation, of wire working means movably mounted at opposite sides of the raceway and respectively adapted to straighten coaxial leads, the lead-straightening means being relatively adjustable laterally one to the other to enable the oppositely extending leads of the different sizes of component bodies to be straightened.

A further feature of the invention pertains to the provision in a component handling machine of novel wire or lead-straightening means comprising a pair of cooperative lead-spinning disks, said disks being mounted for rotation in the same direction and so that their peripheries frictionally engage, in any given instant, diametrically opposed portions of a lead, and a pair of cooperative lead-straightening rolls respectively coaxial with said disks, said rolls having cooperative cylindrical surfaces formed progressively to engage and straighten the lead during its spinning from its component body to an outer extremity, the peripheries of one of said disks and its coaxial straightening roll being provided with alined coaxially extending grooves to receive the straightened lead and remove it for further feeding.

The above and other features of the invention, including transfer mechanism for controlling and spacing the successive components as they are introduced to the above-mentioned lead straightening means from the raceway, and various other novel details of construction and arrangements of parts will now be described with more particularity in connection with an illustrative embodiment and with reference to the accompanying drawings thereof, in which Fig. 1 is a view of a portion of a bundle of components having their coaxial leads straightened and their bodies belted in succession by a tape in the machine illustrative of this invention;

Fig. 2 is a view similar to Fig. 1 and indicating the alternative manner in which the machine to be explained herein may link successive straightened leads with tape or the like;

Fig. 3 is a view in side elevation of a component packaging machine exemplifying this invention, portions of the frame and supporting legs therefor being broken away;

Fig. 4 is a detail in perspective of one of the two lead-feeding and straightening roll assemblies and associated parts shown in the machine of Fig. 3;

Figures 1, 2, 3, 4:
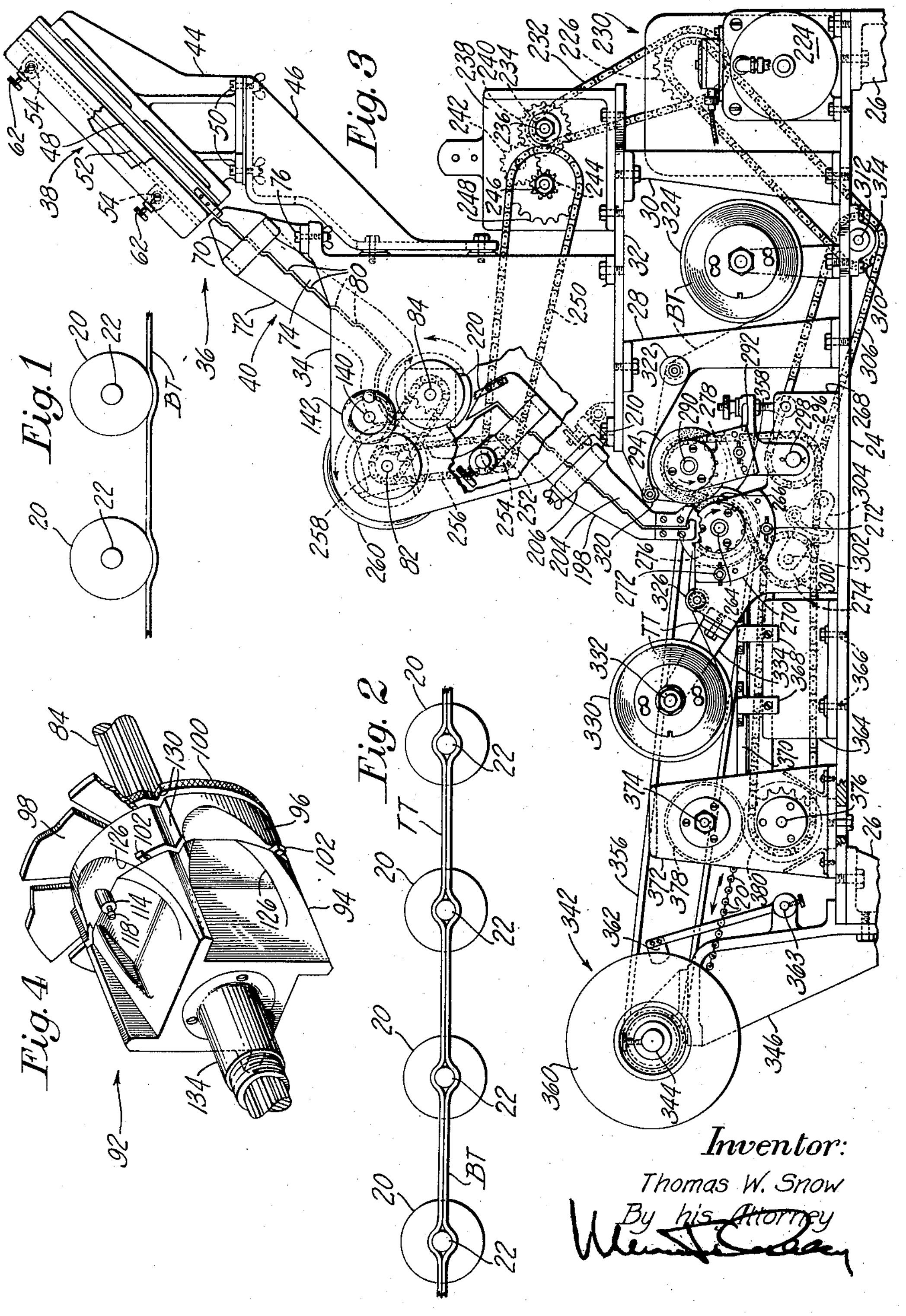

The general arrangement of the illustrated machine is such that the driving mechanism extends along one side, the fixed or "remote" side as viewed in Fig. 3, which is the side mounting various operating parts in fixed operating positions, and corresponding operating parts which are laterally movable are disposed along with their lateral adjusting means on the opposite or what may be termed the near or operator's side of the machine. Thus, an operator will introduce components 20 having coaxial leads 22 to be straightened and then bundled, as shown in Figs. 1 or 2, into the upper end of a raceway at his right, as viewed in Figs. 3 and 6, and they will be fed through the machine, to be described ultimately, being reeled at the left-hand end of the machine. For supporting the machine, a flat table, or bench top 24 (Figs. 3 and 6), is preferably supported at waist height by legs 26 (two only shown in Fig. 3). Secured on the table top are brackets 28, 30 (Fig. 3) for supporting the horizontal plate 32 on which is mounted a frame 34 partially enclosing the wire or lead straightening mechanism hereinafter to be explained.

For delivering the components successively to the lead straightening mechanism, the illustrative machine is provided with an adjustable raceway generally designated 36 and comprised of an upper receiving portion 38 and a stepped or "waterfall" portion 40. The receiving portion 38 is adapted to be loaded with a card of components arranged side by side, as disclosed in the application referred to above, though it will be understood that other than card mounted components may be introduced. The portion 38 includes spaced castings 42, 44 (Fig. 5) secured on a bracket 46 fixed on the frame 34. The casting 42 includes a component body engaging guide 43 (Fig. 5) and is normally fixed. The casting 44 is slotted transversely and includes a guide 48 parallel to the guide 43 and laterally adjustable by means of bolts 50 extending through the casting slots. A retainer bar 52 carried by parallel slide rods 54 is disposed in one position to engage the corresponding ends of component bodies which are being accommodated between the raceway guides 43, 48. The bar 52 may be lifted from its retaining position to permit loading, bored arms 56, 56 adjustably holding the slide rods, being pivotally mounted, respectively, on pins 58 of bearing brackets 60, 60 affixed to the casting 42. Clamp screws 62, 62 threaded through the arms 56 may engage the rods 54 to hold the bar 52 in a lateral position which usually will correspond with that of the adjustable guide 48.

Figure 7:
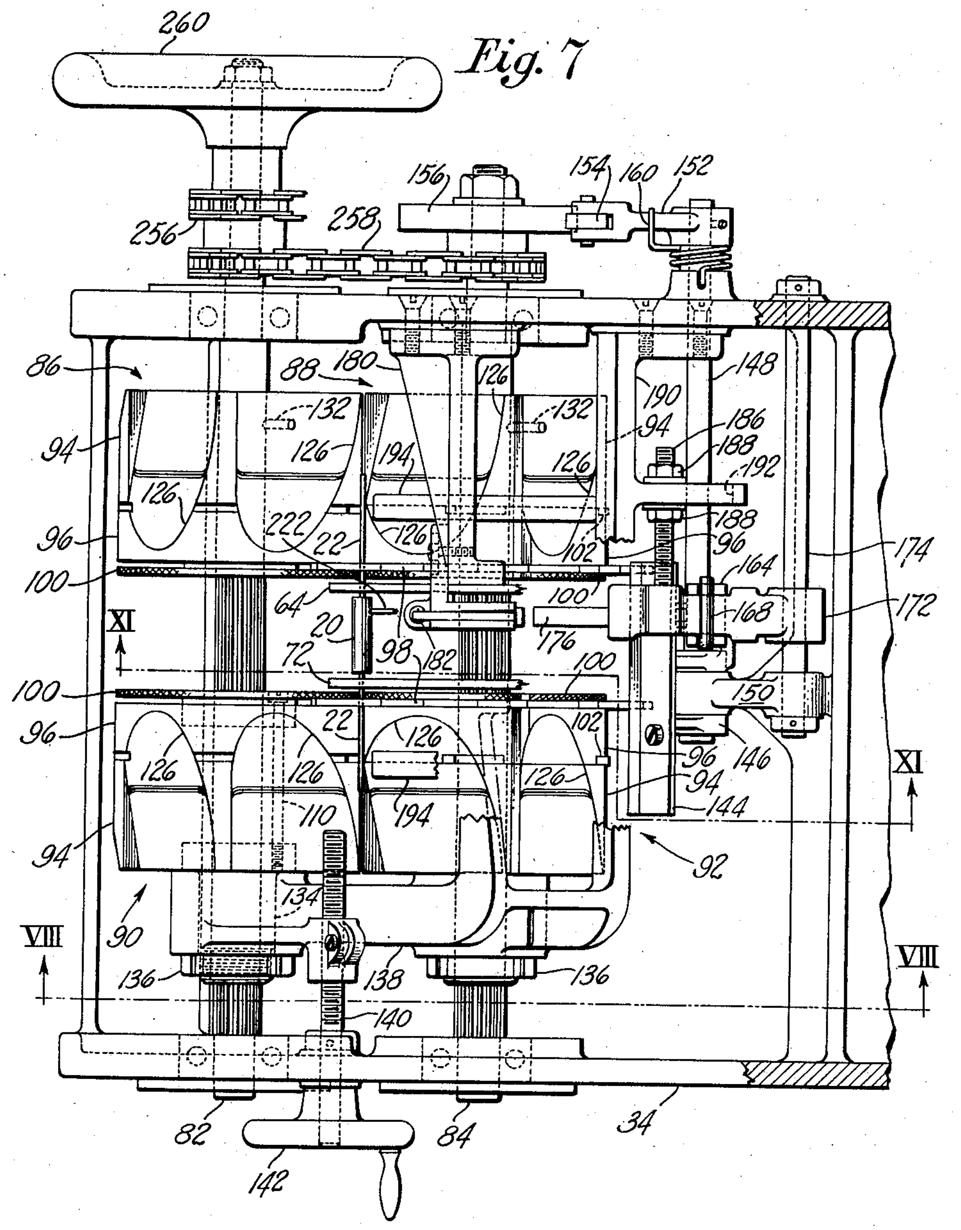
Fig. 7 is an enlarged view, looking in the direction of the arrows VII—VII in Fig. 8, of the lead straightening means shown in Fig. 5, a component being shown in position as it is released to the straightening rolls.
Figure 8:
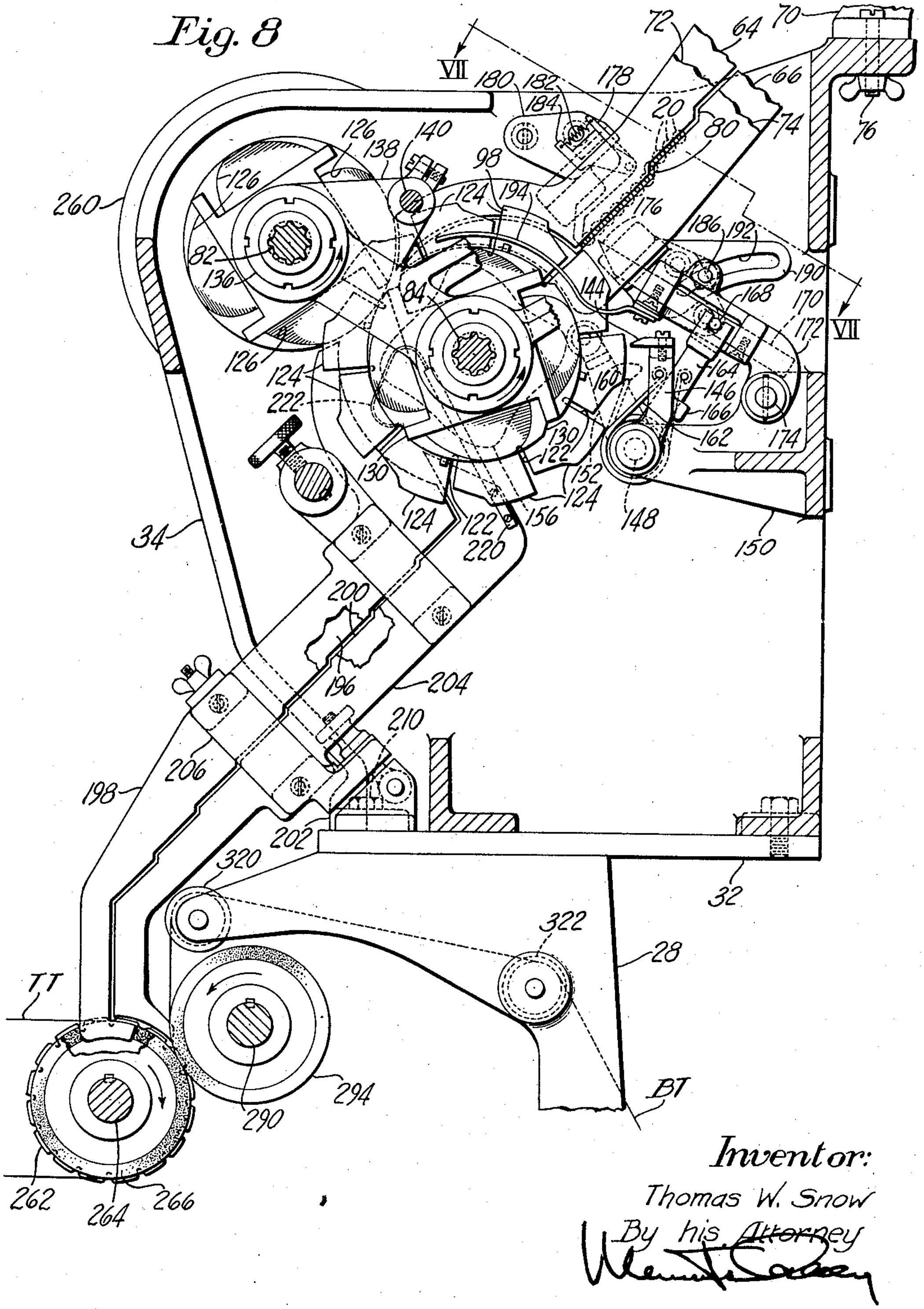
Fig. 8 is a section taken on the line VIII—VIII in Fig. 7.

The stepped raceway portion 40 includes upper and lower fixed guides 64, 66 (Fig. 8) in line with the guide 43 and carried by a U-shaped bracket 68 (Fig. 5) secured on the frame 34. A U-shaped bracket 70 (Fig. 5), carrying upper and lower raceway guides 72, 74 alined with the guide 48, is adjustably secured on the frame 34 by clamp screws 76 extending through a slot 78 (Fig. 5) in the frame. The raceway 36 is normally well supplied with components which descend in succession under the influence of gravity, steps 80 (Fig. 3) formed on the guides defining a path serving to maintain the coaxial leads of the components in generally parallel relation, or more accurately, serving to restore parallel relation to those leads which may tend to run askew. As more clearly shown in Figs. 8 and 9, the lower portion of the path of the components, as defined by the raceway 36, becomes convex and they are conducted therein, as will later be explained, to a lead straightening position indicated in Fig. 7.

Figures 11, 12:
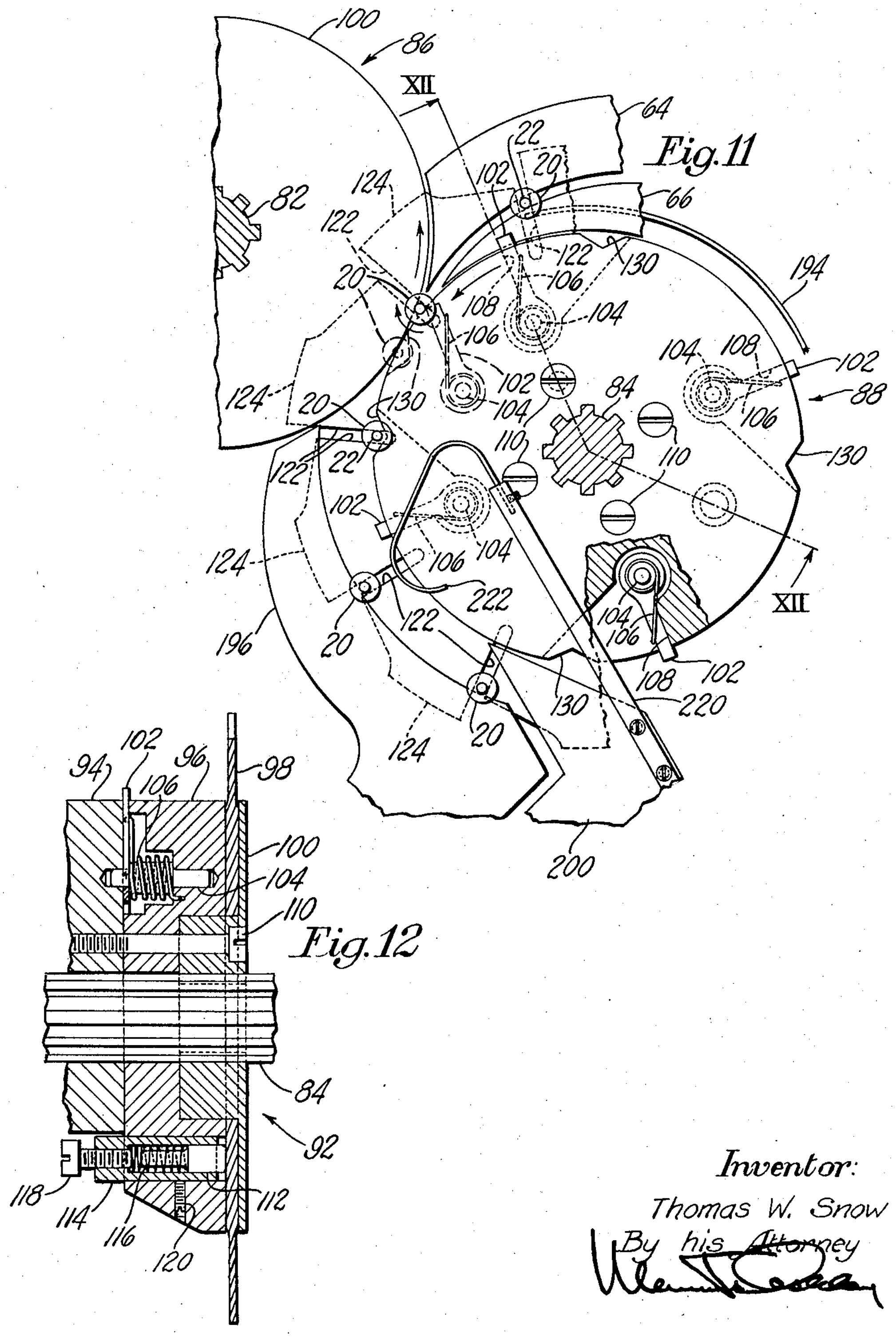
Fig. 11 is a section taken on the line XI—XI in Fig. 7 and corresponding with Fig. 9, but on a larger scale and showing a series of components in their progressive positions.
Fig. 12 is a section taken on the line XII—XII in Fig. 11.

Parallel upper and lower splined shafts 82, 84 (Figs. 3, 7, 8 and 11) are respectively journaled for counterclockwise rotation (as viewed in Figs. 3, 8, 9 and 11) in bearings mounted in the frame 34. The shaft 82 carries a normally fixed lead straightening roll assembly generally designated 86 (Fig. 7) arranged to cooperate with a normally fixed roll assembly, generally designated 88, on the shaft 84, and which is nearly identical with the assembly 86. The shaft 82 also carries a laterally adjustable lead straightening roll assembly, generally designated 90, and arranged to cooperate with a similarly adjustable and nearly identical roll assembly, generally designated 92, mounted on the shaft 84. In view of the similar mounting and construction of the upper roll assemblies 86, 90, and of the similarity in the lower roll assemblies 88, 92, it will suffice in this respect merely to describe the construction of the assembly 92 (Figs. 4, 12) and to indicate its distinctions from the assemblies 86, 90. Referring to Figs. 4 and 12, the roll assembly 92 comprises, in coaxial alinement, complemental cylindrical lead straightening portions 94, 96 having rough frictional surfaces (sometimes sandblasted), a pick-off disk 98 not included in the upper assemblies 86 or 90, and a lead spinning disk 100 having a diameter equal to that of the portions 94, 96, the perimeters of the disks 100 sometimes being knurled to improve spinning action. The portions 94, 96 could be built as one piece, except that their construction in two separate parts facilitates inclusion in the assembly of a radially projecting finger 102 which, though not indispensable, is included for a purpose mentioned later. This finger is not included in the upper rolls 86, 90, but is arranged to engage transversely an intermediate portion of a lead being straightened. As shown in Fig. 12, the portions 94, 96 of the lower rolls are recessed in adjacent end faces to receive the ends, respectively, of a fulcrum pin 104 on which the finger 102 is pivotally mounted. A coil spring 106, having one end anchored in the portion 96, is also mounted on the pin 104, the other end of the spring being arranged to engage a side of the finger thereby yieldingly to resist displacement of the finger in a direction counter to the direction of rotation of the roll assembly 92 and away from a radial wall 108 (Fig. 11) of the portion 96.

Of the several parts comprising the roll assembly 92, only the spinning disk 100 is splined to its shaft 84, and the parts are axially secured together by bolts 110 (Figs. 11 and 12). To provide for frictional drive of the pick-off disk 98 which is rotatably mounted on a hub of the spinning disk 100, a plunger 112 (Fig. 12), slidably extending from one end of a tubular sleeve 114, is arranged to engage the pick-off disk endwise. The plunger is thus urged by means of a compression spring 116, one end of which bears on a shoulder of the plunger with a pressure which may be adjusted by a screw 118 threaded into the sleeve and bearing on the other end of the spring 116. A setscrew 120 holds the sleeve 114 in its bore formed in the portion 96. As will hereinafter become more clear, the reason for this frictional drive of the pick-off disk 98 is to enable the successive components to be straightened, to be picked out of the raceway 36 and thus to space and time themselves for their entry into the straightening zone, the disks 98, 98 then being momentarily stopped while restraining the leads against bodily movement from an effective operating position. Perimeters of the pick-off disks 98 are respectively formed with a series of spaced radial slots 122 (Figs. 9, 11), respectively, adapted to accommodate a component lead and defining a series of similar segments 124, the leading edge of each segment projecting radially more than its trailing edge so that oppositely disposed leads of successive endmost components in the raceway 36 may be engaged by successive pairs of leading edges of the segments. As herein shown, the straightening portions 94, 96 have their cylindrical surfaces interrupted by four milled recesses 126, the inner ends of each quarter of the cylindrical surface of the portion 96 thus being left unmilled for engagement with those portions of a lead nearer its component body, and progressively less on each quarter remaining in cylindrical shape to engage and act on those lead portions extending farther from a component body. In the design shown, four leads will be straightened per revolution of the roll 92 in cooperation with a synchronized revolution of the roll 90, the four leads being acted on by successive cooperating quarters, and corresponding coaxial leads being simultaneously straightened by the rolls 86, 88.

Each of the lower roll assemblies 88, 92, unlike the upper assemblies 86, 90 which serve no feeding function, is formed with an axially extending V-shaped groove 130 (Figs. 4, 11) that is disposed between each of the shaped quarters and continues across the lower spinning disks 100. These grooves have a depth to accommodate the diameter of the largest leads to be straightened and act, as will be later described, to transfer a component from the straightening zone. For holding the fixed roll assemblies 86, 88 to their respective shafts 82, 84, pins 132 (Figs. 7 and 9) extend through alined bores formed in the shafts and the adjacent portions 94. In order to effect relative lateral adjusting movement between the assemblies 86, 88 and the assemblies 90, 92, portions 94 of the latter are each provided with a sleeve 134 (Fig. 4) having threaded connection with spanner nuts 136, 136

(Fig. 7), respectively, and a shifter yoke 138 mounted on the sleeves is thereby held against outer end faces of the portions 94. Thus, to adjust the assemblies 90, 92 laterally, a jack screw 140 is provided having threaded connection with the yoke, the jack screw being fixed against endwise movement in its bearing in the side of the frame 34 and being rotatable by means of a hand wheel 142. An inwardly extending portion of the yoke 138 is secured to the upper and lower raceway guides 72, 74, the clamp screws 76 and the bolts 50 being loosened to permit operation of the hand wheel 142 in simultaneously positioning the assemblies 90, 92 and the guides 72, 74.

Figure 10:
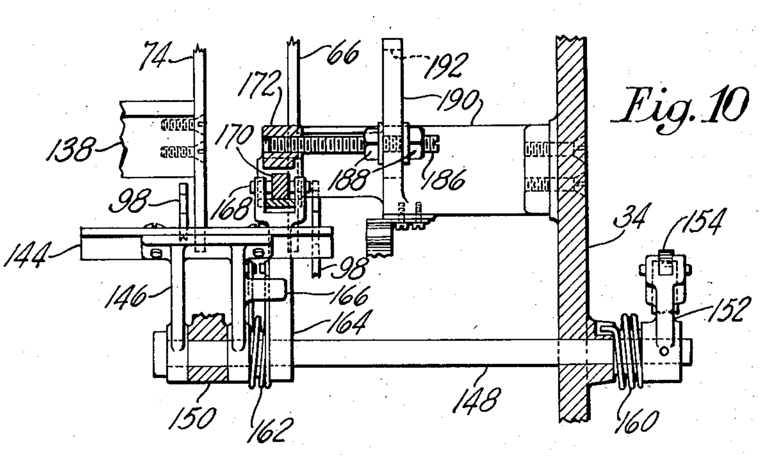
Fig. 10 is a section taken on the line X—X in Fig. 9.
Figure 9:
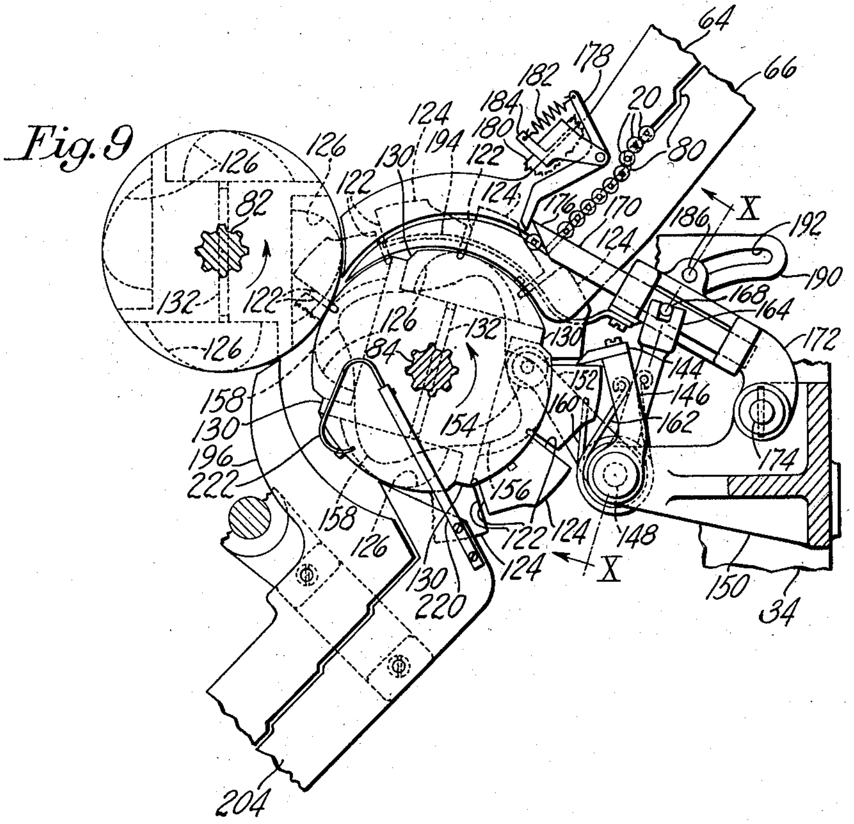
Fig. 9 is a view of certain parts shown in Fig. 8 but at a subsequent stage in their operation, a component being introduced from the raceway by pick-off mechanism.

As above indicated, the individual components, or more precisely the different sizes of their lead diameters, are themselves caused to control the spacing and timing of their entry into an operative straightening zone wherein each lead, somewhat in the manner of a pinion rotatably engaged between a driving and a driven gear, will be spun about its longitudinal axis between cooperative spinning disks 100 and between cooperative portions 96, as indicated in Fig. 11. Means are provided, however, for coordinating the entry of a first component of any given size within the range of the machine design, as will now be described. A timer blade 144 (Figs. 7, 8 and 9), of suitable length to span the pick-off disks 98, 98 in their most remote lateral positions and disposed at times to engage them, is secured to the upper end of a forked arm 146 pivotally mounted on a rod 148. This rod has spaced bearings in an internal bracket 150 integral with the frame 34 and in one side of that frame. For actuating the timer blade 144, an arm 152, secured on the outer end of the rod 148, carries a roll 154 engageable with a cam 156 affixed on an end of the shaft 84 and having four similarly shaped and equally spaced salients or quadrants 158 (Fig. 9). The roll 154 is biased for such engagement by a coil spring 160 having one end anchored in the frame 34 and its other end engaging the arm 152. Movement of the blade 144 from an inoperative position and into engagement with a pair of leading edges of corresponding segments 124 is effected yieldingly against the resistance of a coil spring 162 (Figs. 9, 10), one end of which is secured to the arm 146 and the other end of which is connected to a feed rocker arm 164 adjustably secured on the rod 148 and provided for a purpose about to be explained. A lug 166 (Figs. 8, 10) integral with the forked arm 146 is disposed to engage a side of the rocker arm 164, and thus movement of the timer blade 144 toward the pick-off disks is limited.

The arm 164 has a forked end straddling a pin 168 in a spacer or separator 170. The cam 156 thus operates to reciprocate the spacer 170 endwise in spaced bearings formed on a normally stationary but laterally adjustable lever 172 which has one end secured by a setscrew to a rod 174 rotatably supported at its ends by the frame 34 and the bracket 150. The left-hand end of the spacer (as viewed in Figs. 7, 8 and 9) is wedge shaped, an acute upper portion 176 being disposed to be thrust between successive bodies of the lowermost components in the waterfall portion 40 of the raceway and the next to lowermost component body. Each of the four reentrant portions of the cam 156, as indicated in Fig. 9, is thus operative to permit the spacer portion 176 to advance and cam the endmost component into the previously referred to convex portion of the raceway 36 wherein its leads will be engaged by the pick-off disks 98 while acting to retain the next to endmost and subsequent components in the raceway portion 40. When the spacer 170 is retracted from the raceway by a cam salient 158, the components are retained in the raceway portion 40 by the lower end of a bell crank lever 178 which is pivotally supported by and laterally adjustable on a bracket 180 (Fig. 7) secured to the frame 34. The lever 178 is displaceable clockwise (as viewed in Fig. 9) from its retaining position by the spacer 170 against the resistance of a tension spring 182 connecting the upper end of the lever 178 and a projection 184 affixed on the bracket 180. In order to enable the spacer properly to separate component bodies of different sizes (i. e., diameter or equivalent dimension), its path of reciprocation may be adjusted heightwise. For this purpose, a screw 186 (Figs. 7, 9 and 10) threadedly extending into a bore formed on the lever 172, is provided with a pair of clamping nuts 188, 188. These are respectively arranged to engage opposite sides of a bracket 190 secured to the frame 34 and formed with an arcuate slot 192 through which the screw 184 thus adjustably extends. To insure that those entering leads which are bent more than usual are not prematurely interfered with by the fingers 102 of the roll assemblies 88, 92 which may be rotating faster than their pick-off disks 98, a pair of laterally spaced arcuate strips 194, 194 (Figs. 7 and 9) overhanging the roll assemblies are respectively secured at their right-hand ends, as viewed in Fig. 9, to the bracket 190 and to the shifter yoke 138. These strips are disposed to engage the more outward portions of the leads, if any, and thus segments 124 conduct successively separated endmost components to their spinning position shown in Figs. 7 and 11.

Figures 5, 6:
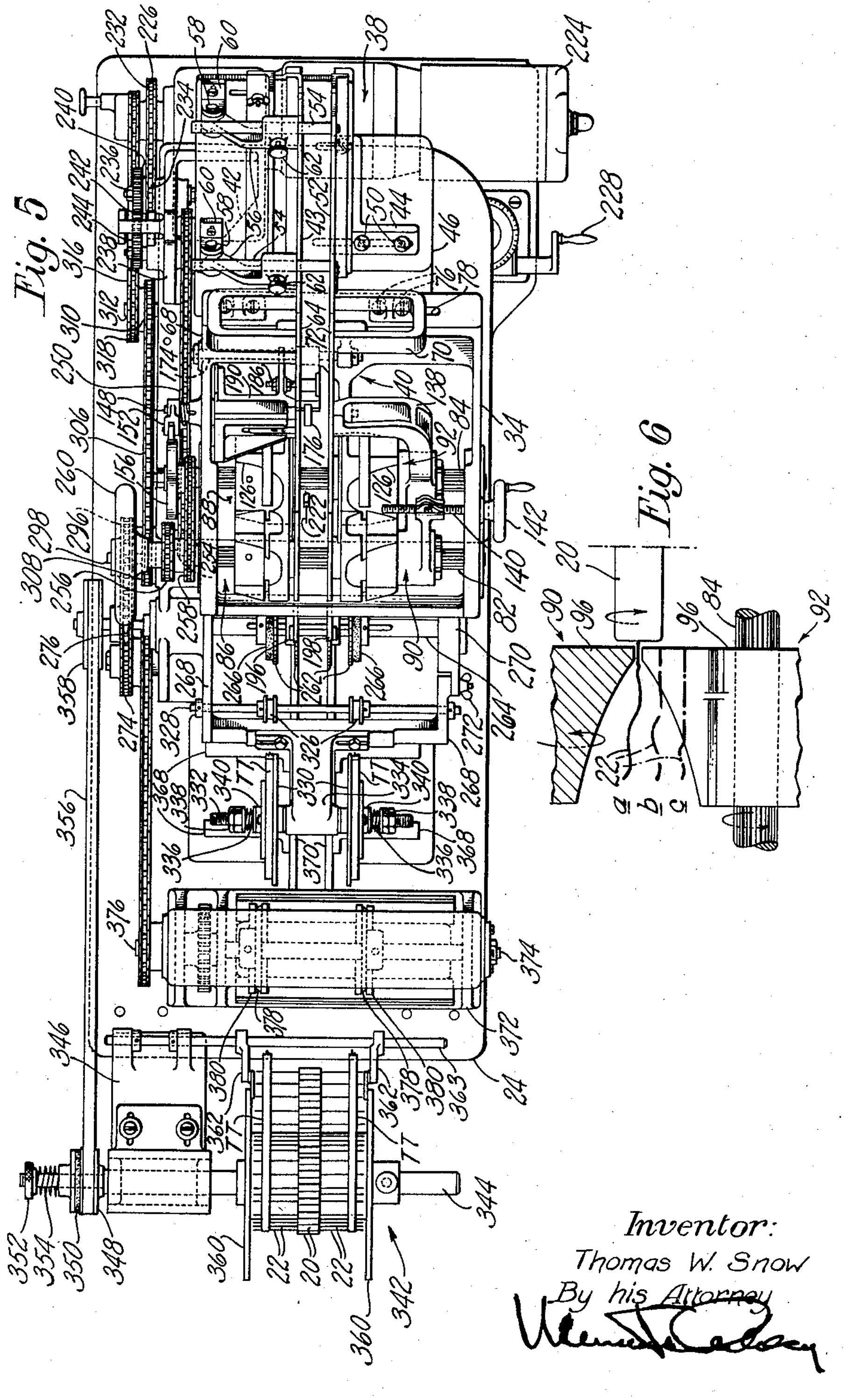
Fig. 5 is a plan view of the machine shown in Fig. 3.
Fig. 6 is an enlarged view in elevation of cooperative portions of the two lead straightening rolls and schematically indicating their progressive wire straightening action.

The spinning disks 100, 100 of each cooperative pair, and the cylindrical operating surfaces of the portions 94, 96 of each pair of roll assemblies have the proximate portions of their perimeters spaced apart less than the diameters of the leads to be straightened. When a component emerges from the convex portion of the raceway 40 with its leads retained in alined pick-off slots 122, its leads are spun at the same rate by both pairs of disks 100, and during the interval of spinning and straightening the component is not bodily advanced, its leads preventing rotation of the pick-off disks. A spinning lead is acted on by cooperative quarters of upper and lower roll assemblies, as schematically shown in Fig. 6. Thus, cooperative and effectively increasing longitudinal cylindrical surfaces act progressively outward on a spinning lead from its component body to effect straightening. Not until the full lengths of the leads have been straightened do alined V-grooves 130 come into register with the pick-off slots 122 in the straightening zone to receive the straightened leads and thus transfer a component therefrom, the pick-off disks 98 then being free to rotate again and thus deliver the next component in the next alined pick-off slots 122 into the straightening zone as then defined by the next succeeding cooperating quarters of the roll assemblies. It will be seen that the timer blade 144, though continuously operating, effectively operates only to position and synchronize the first component (shown being introduced in Fig. 9) to be straightened with respect to the straightening rolls, the leads themselves thereafter acting as the effective timers.

Fig. 11 illustrates a straightened component as its leads are being carried in V-grooves 130 to a point where gravity normally will cause the component to be moved downward in the pick-off slots 122 and onto a parallel pair of upper raceway guides 196, 198. The guide 196, together with a lower fixed guide 200, is supported by a bracket 202 (Fig. 8) secured to the plate 32, and the guide 198 is adjustable laterally along with a lower guide 204. The guides 198, 204 are secured to a bracket 206 which is slotted slidably to receive a clamping bolt 210 threaded into the plate 32.

Secured to the guide 204 is an arm 220 having a bent wire finger 222 disposed to engage the straightened components and thus insure that they are discharged to the guides 196, 198.

Mechanism for driving the lead straightening means, as well as subsequently explained tape applying means, will now be described. A motor 224 (Figs. 3 and 5) secured on the table top 24, is coupled through suitable reduction gearing (not shown) to drive a sprocket 226 at a speed which is adjustable to satisfy the preference of an operator, his control being exercised by a hand crank 228 (Fig. 5) which, through flexible cable, regulates a conventional variable speed drive generally designated 230 (Fig. 3). It is found, too, that straightening operations on different sizes of components are generally performed better at different speeds for each operator. An endless chain 232 in mesh with the sprocket 226 is also in mesh with a sprocket 234 fast on a stub shaft 236 journaled in a change-gear box 238 mounted on the plate 32. Through a change-gear 240 detachably fixed on the stub shaft 236 and a pinion gear 242 journaled in the box 238, a change-gear 244 is caused to drive a stub shaft 246 journaled in the box and carrying a sprocket 248 on its inboard end. The sprocket 248 operates a chain 250 to rotate a stub shaft 252 journaled in the frame 34 and carrying a sprocket 254 which, in turn, operates a chain 256 arranged to drive the splined shaft 82. The splined shaft 84 is driven by a chain 258 having sprocket engagement therewith and with the shaft 82. A hand wheel 260 is mounted on the outboard end of the latter conveniently to permit manual operation, inspection or adjustment.

Although each revolution of the straightening roll assemblies delivers four components, regardless of their size, for descent between the fixed raceway guides 196, 200 on the one hand and the movable raceway guides 198, 204 on the other hand, the number of components which can be taped in each revolution of a set of four coaxial sprocket or pitch wheels 262 (Fig. 5) rotatably mounted successively to receive the straightened components as they are discharged from these guides is dependent upon their body size, i. e., their body diameter or a dimension corresponding thereto. Thus, fewer components may be taped per pitch wheel revolution as the body diameters are larger requiring effectively greater pitch, and it is found, for example, that in each revolution of a given set of wheels, 45 comps. may be belted at about .200" pitch
24 comps. may be belted at about .375" pitch
18 comps. may be belted at about .500" pitch
12 comps. may be belted at about .740" pitch
8 comps. may be belted at about 1.+" pitch Accordingly, to operate the pitch wheels 262 at a speed appropriate for a given component and at the same time provide a suitable speed or output of the straightening roll assemblies, the change-gears 240, 244 may be removed and others substituted therefor as the size of the bodies of the components to be belted dictates. For lead-taping components, pairs of the wheels 262 are normally spaced on a shaft 264 so that they are respectively arranged to engage the inner ends of the leads adjacent to the component bodies and also the outer portions of the leads adjacent to the point of application of the tape. Conveniently, in changing the outer sprocket wheels 262 for outer wheels having teeth of different pitch, presser rolls 266, 266, preferably of rubber, are coaxially secured thereto and have integral hubs which are bored to receive setscrews for fixing the wheels- rolls in selected axial position. The shaft 264 is journaled at one end in a side of frame structure 268 upstanding from the top 24, and its other end is received in a demountable bearing 270 normally secured by wing nuts 272, 272 to the opposite side of the frame 268.

Referring to Figs. 3 and 5, the pitch wheels 262 are driven from the sprocket 226 as will now be described. They are rotatably driven by a chain 274 meshing with a sprocket 276 on the shaft 264. The chain 274 is also in mesh with a sprocket 278 on a shaft 290 carried by a pair of brackets 292 adjustably supported by the frame 268. Mounted on the shaft 290 is a pair of presser rolls 294 (one shown) arranged to cooperate respectively with the rolls 266 in applying pressure sensitive tapes BT (Fig. 3) to the under portions of successive leads. The chain 274 meshes with a sprocket 296 on a shaft 298 journaled in the frame 268 and with a takeup sprocket 300 on a shaft 302. The latter is carried for heightwise adjustment by the upper ends of a pair of levers 304 pivoted adjustably at their lower ends in the frame 268. For driving the chain 274 an endless chain 306 is in mesh with a sprocket 308 on the shaft 298 and with a sprocket 310 fixed on a shaft 312 mounted in a bearing block 314 secured to the top 24. The chain 306 in turn derives its power from an endless chain 316 meshing with a sprocket 318 on the shaft 312 and with a sprocket on the shaft driving the motor driven sprocket 226. Rotation of the cooperative presser rolls 266, 294 is relied on to unroll and apply both the mentioned under tapes BT and also pressure sensitive upper tapes TT. Thus, each of the tapes BT is drawn over spaced idler rolls 320, 322 carried by the bracket 28 and unwound from supply reels 324 (one shown) rotatably mounted above the top 24. Each of the tapes TT is drawn over an idler roll 326 adjustably supported on a shaft 328 journaled in the frame 268, the tape TT coming from a pair of supply reels 330 mounted on a shaft 332. This shaft is rotatably mounted in a bearing bracket 334 secured for lateral adjustment on the frame 268. As in the case of the reels 324, the reels 330 are each restrained from overtravel, a compression spring 336 on the shaft 332 being backed by a nut 338 adjustably threaded thereon to urge a friction disk 340 into engagement with the hub portion of each reel.

It will be understood that if body-taping is preferred to lead-taping a single tape BT only need be used, its supply and idler rolls being suitably shifted laterally in the machine to aline as desired with the component bodies. In this case a single presser roll 294 is arranged to apply tape to the component bodies and a single cooperative presser roll is disposed to back up the successive bodies as they are being taped.

The belted components are accumulated on a storage reel 342 (Figs. 3 and 5) that is detachably mounted on a frictionally driven shaft 344 carried by a bearing bracket 346 secured to the top 24. A reduced end portion of the shaft 344 is provided with a pulley 348 substantially free to rotate thereon, the pulley being engaged by a friction disk 350 with a pressure that may be adjusted by means of a nut 352 threaded on the shaft 344 and engaging one end of a spring 354, the other end of which engages the disk. The pulley is operated by a belt 356 running over a pulley 358 on the outboard end of the shaft 264. Since the side disks 360, 360 of a storage reel 342 may be of non-rigid material such as cardboard or plastic, fingers 362, 362 slidably and pivotally mounted on a rod 363 carried by the bracket 346 may be disposed to engage the inside surfaces of the disk 360 to hold them apart. To guide the belted components as they advance from the pitch wheels to the storage reel 342, a pair of lower guide rails 364, 364 are provided, their bases being laterally slotted to receive clamping bolts 356 threaded into the top 24. A pair of U-shaped brackets 368 secured to each rail 364 supports an upper guide rail 370, the inner edges of the rails 364, 370 normally extending adjacent to the ends of the component bodies.

As herein shown, the machine may be provided with means for severing the coaxial leads to desired lengths. For this purpose a casting 372 is secured to the top 24 and is journaled to support a pair keyed shafts 374, 376 in parallel relation. The shaft 374 carries a pair of laterally adjustable circular knives 378, 378 the cutting edges of which are disposed at the inner ends of the angular peripheral faces. Each of the knives is disposed to cooperate with a circular shearing disk 380 mounted on the shaft 376 and having a serrated periphery. This periphery is arranged to engage and support the leads to be severed and is recessed to afford an inner shearing edge cooperative with the cutting edges of the knives, the shearing preferably occurring just before the components emerge from between the rails 364, 370. For driving the knives 378 their shaft 374 has gear connection with the shaft 376 and the latter has sprocket and chain connection with the shaft 302.

It is to be recognized that with only minor modifications the illustrative machine may be organized to belt and, if necessary, to cut the components being reeled without effectively operating the lead straightening mechanism. Also, of course, the components may merely have their leads straightened and then be conducted into a container without being linked by tape, the pitch wheels being omitted or merely used to deposit the components. Briefly to review the operation of the machine, particularly its lead straightening function, and assuming the raceway guides, belting means, and cutting knives have been adjusted laterally and otherwise as appropriate, the coaxial lead components to be processed will be loaded into the raceway 36. The motor 224 is operated at the selected speed to drive the roll assemblies 86, 88, 90, 92 and the appropriate pitch wheels 262 in the desired speed ratio as determined by the particular change-gears 240, 244 used. The bottommost component in the raceway portion 40, one which had been retained therein by the lever 178, is transferred into the path of the pick-off disks 98 by the cam-actuated spacer 170. It being a first component to have its leads straightened, the timer blade 144 in the course of the feeding movement of the spacer, is pivoted and effectively alines the pick-off segments 124. Consequently, when a cam salient 158 acts to retract the blade, the leading edges of the segments rotate in phase, being driven frictionally by the plunger 112, and the component is carried in alined slots 122 into the straightening zone. Its movements may be said to be shown sequentially as indicated by its succssive positions in Figs. 8, 9 and 11. The pick-off disks 98, 98 are restrained from rotation during lead straightening since the spinning leads are momentarily prevented from advancing. This is due to the fact that there is insufficient space for their diameters to pass between the approximate portions of the perimeters of the disks 100 and of the portions 96. When feeding by the pick-off disks 98 is being timed by the component leads, the disks 98 are stopped within a certain range dependent on the diameter or thickness of the leads, the thinner leads stopping the disks relatively later (i. e., further ahead) than the thicker leads. The timer blade 144 operates to stop the pick-off disks beyond that range and substantially as though the leads to be straightened had zero thickness. Thus, when no component is coming into the straightening zone (as when the first component is being fed along the lower end of the raceway 36), the disks 98 continue through their usual lead-stopping range and are then stopped by the blade 144.

In the straightening zone the oppositely extending leads 22, 22 of a component are caused by the rotation of the disks 100 and the roll portions 96 to spin about an axis which is normally coincident with the axis of its body. The arrangement and control of the timer blade 144 is such that the leads of the component to be straightened will initially engage the narrower part of the cylindrical surfaces of the spinning disks 100 and the roll portions 94, 96 and cannot be introduced just behind a pair of fingers 102 to escape straightening action via the oncoming alined V-grooves 130. The adjacent and advancing fingers 102, 102 each yieldingly bear on the leads in the straightening zone equally to urge them into engagement with the operative surfaces of the disks 100 and of the portions 96, and thus prevent any tendency of a component lead to wobble out of the straightening zone while being spun. In like manner, the balanced pressure exerted by the momentarily stationary disks 98, 98 prevents a component's leads from leaving their most effective operating position in the straightening zone. As indicated in Fig. 6, the narrower cylindrical surfaces of the portions 96 cooperate first on a lead to confine and impart axial straightness, the broader surfaces increasingly coming into cooperation in a manner such that the leads are straightened from an inner to an outer end. This is advantageous in that lead spinning can be more effectively generated when there is less straightening work to be done, as is generally the case with lead portions nearer the component body, and the usually more bent portions will be acted on more effectively while the lead is rapidly revolving. In some instances satisfactory operation may be had with the disks 100 omitted (or considered to be merged with the adjacent roll portions 96) though usually they are desirable to space the disks 98 from the component bodies and to obtain a better initial straightening bite on the leads. As the fingers 102 yield clockwise (as viewed in Fig. 11) on their pins 104 as a consequence of their engagement with leads being straightened, the outer ends of the fingers finally recede beneath the level of the cylindrical straightening surfaces, and oncoming V-grooves 130, upon register with the radial slot 122 then in the straightening zone, receive the straightened leads to transfer the component from between the roll assemblies and forwardly for further processing. Succeeding alined pick-off slots 122 are thereupon effective to carry the next component to be straightened into the straightening zone defined by the next cooperating formed quarters of the roll assemblies.

The invention, as may be appreciated from the foregoing description, affords a reliable and versatile machine which is capable of precision work and high output, its features being adaptable not only to the treatment of coaxial lead type components, but also to the processing of components and even nonelectrical articles respectively having only single wire-like projections extending therefrom.

Having thus described my invention, what I claim as new and desire to secure by Letters Patent of the United States is:

1. In a machine for operating on coaxial lead type components, spaced lead straightening means mounted for operation on the leads of the components in succession, one of said straightening means being laterally movable relatively to the other, mechanism for moving one of said lead straightening means laterally relatively to the other to accommodate different sizes of component bodies between them, and means for feeding the succession of components to and from said straightening means, said feeding means including raceway guides laterally movable relatively to one another by operation of said mechanism to accommodate the component bodies in accordance with the spacing of said straightening means.

2. In a machine for straightening the leads of electrical components, a pair of straightening rolls respectively having axes substantially parallel to the leads and cooperative cylindrical surfaces which are spaced apart less than the diameter of individual leads to be straightened thereby, means for urging the leads into the bight of the straightening rolls, and means for rotating said rolls in the same direction in engagement with said leads to spin them in the opposite direction, one of said rolls having an axially extending groove in its cylindrical surface arranged to receive a lead when straightened and transfer it from between said rolls.

3. A machine for straightening leads of coaxial lead type components, comprising guide means for feeding the bodies of components in row formation with their leads extending beyond opposite sides thereof, a pair of cooperative roll assemblies disposed adjacent to each of the opposite sides of said guide means and with their axes in right-angular relation thereto for straightening the oppositely extending leads of the successive components in the course of their feeding movement, each of said assemblies including cooperative cylindrical lead engaging surfaces of a configuration adapted progressively to contact an increasing length of each lead as measured from its body, proximate portions of the peripheries of the cooperating cylindrical surfaces being spaced apart less than the diameter of the lead to be straightened, and means for rotating said roll assemblies in phase and in the same direction.

4. A machine as set forth in claim 3 and further characterized in that said guide means is adjustable laterally to accommodate component bodies of different length, and means is provided for correspondingly adjusting the relative lateral positions of said pairs of cooperative roll assemblies.

5. In a lead straightening machine, means for feeding successive electrical components into a lead straightening zone, a pair of cooperative rolls in said zone having their axes parallel and having proximate portions of their cylindrical perimeters spaced apart less than the diameter of the individual leads to be straightened, means engageable with each lead being acted upon by said proximate portions adjacent to its component body to hold it in effective operating position when being spun and straightened between the instantaneous operating portions of said rolls, and means for rotating said rolls in the same direction.

6. A lead straightening machine, comprising means for feeding coaxial lead type components in row formation with their leads extending beyond opposite sides thereof, two pairs of roll assemblies arranged for relative axial movement to accommodate different sizes of component bodies as received from said feeding means, each pair of roll assemblies having axes substantially normal to the sides of the feeding means and including cooperative lead engaging cylindrical surfaces the proximate portions of which are spaced apart less than the diameters of the leads to be straightened, means momentarily operative on the coaxial leads of successive components for restraining them against movement from effective operating position adjacent to said proximate portions, and means for rotating the roll assemblies of said pairs in the same direction and speed.

7. A machine as set forth in claim 6 and further characterized in that said lead restraining means consists of coaxial pick-off disks disposed to engage the leads of a component adjacent to opposite ends of its body, said disks having a frictional drive connection with said means for rotating the roll assemblies.

8. A lead straightening machine for operating on coaxial lead type components, comprising a pair of parallel shafts, a pair of rolls spaced axially on each of said shafts to provide cylindrical surfaces cooperatively engageable with the leads extending from the corresponding ends of successive component bodies, said surfaces having their proximate portions spaced apart less than the diameters of the leads to be straightened and being recessed to provide narrower lead-engaging surfaces adjacent to a component body than remote therefrom, yieldable means engageable with each lead of the successive components to urge it into effective spinning position relatively to the cooperating cylindrical surfaces, and means for rotating said rolls in the same direction and in time relation to said feed means.

9. A machine as set forth in claim 8 and further characterized in that the rolls on one of said shafts are respectively formed in their wider lead-engaging surfaces with axial alined grooves adapted to receive the straightened leads to transfer them from between the cooperative rolls.

10. A machine as set forth in claim 9 and further characterized in that there is rotatably mounted on said one shaft a pair of pick-off disks for yieldingly advancing successive components by their leads into operative relation between both pairs of cooperating rolls.

11. A machine as set forth in claim 10 and further characterized in that there is rotatably mounted on each of said shafts, for cooperation on the opposite side of each pick-off disk from its adjacent roll, a spinning disk arranged to engage each lead adjacent to its component body, said spinning disks mounted on said one shaft having their peripheries formed with axial grooves alined with the axial grooves in said rolls.

12. A lead straightening machine for operating on coaxial-lead type components, comprising two pairs of laterally spaced lead straightening rolls, a shaft for driving one of said pairs of rolls, raceway means for conducting successive components into the lead straightening zone between said rolls, a segmental disk mounted on said shaft and having frictional driving connection with said one pair of rolls to transfer successive components in spaced relation from the raceway means and into effective operating position in said zone, and cam actuated means controlled by said shaft for releasing successive components from said raceway means for movement into the path of said disk.

13. A lead straightening machine for operating on coaxial-lead type components, comprising an upper and a lower pair of laterally spaced lead-straightening rolls, the cylindrical surface of each upper roll being spaced by less than the diameter of a lead from a cooperative cylindrical surface of one of the lower rolls, the cylindrical surface of each roll of a laterally spaced pair being divided by axially extending lead receiving grooves into portions respectively adapted to engage successive leads to be straightened, and each cylindrical portion being formed and arranged progressively to act in synchronism with its corresponding cylindrical portion to straighten the respective leads from their inner ends outwardly, and means for pressing the leads into the bights of the upper and lower rolls.

References Cited in the file of this patent

UNITED STATES PATENTS

| | | |
|---|---|---|
| 265,265 | Kellogg | Oct. 3, 1882 |
| 2,771,206 | Daniels et al. | Nov. 20, 1956 |

FOREIGN PATENTS

| | | |
|---|---|---|
| 573,994 | Germany | Apr. 7, 1933 |